United States Patent
Ahmed et al.

(10) Patent No.: US 7,982,668 B2
(45) Date of Patent: Jul. 19, 2011

(54) METHOD FOR PROCESSING COMBINED NAVIGATION SIGNALS

(75) Inventors: Rizwan Ahmed, Alexandria, VA (US); Rayman Wai Pon, Cupertino, CA (US); Paul A. Conflitti, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 12/246,914

(22) Filed: Oct. 7, 2008

(65) Prior Publication Data

US 2010/0085250 A1 Apr. 8, 2010

(51) Int. Cl.
*G01S 19/27* (2010.01)
(52) U.S. Cl. .................................... 342/357.66
(58) Field of Classification Search ............ 342/357.12, 342/375.77
See application file for complete search history.

(56) References Cited

U.S. PATENT DOCUMENTS

| 2004/0141574 A1 | 7/2004 | Akopian | |
| 2009/0103656 A1* | 4/2009 | Chen | 375/329 |

OTHER PUBLICATIONS

Mattos, Philip G., "The Implications of Simultaneous Processing of the Galileo L1b/c Signals," Proceedings of the 19th International Technical Meeting of the Satellite Division of the Institute of Navigation ION GNSS 2006, Fort Worth Convention Center, Fort Worth, Texas, Sep. 26-29, 2006, pp. 1861-1865.
Bhatia, et al., "Coherent processing techniques for YMCA++ receivers in different environments" Proceedings of ION GNSS 2006, Sep. 29, 2006, pp. 1866-1877, Ft. Worth, Texas, US.
Gernot, et al., "Comparison of L1 C/A L2C combined acquisition techniques," Proceedings of European Navigation Conference, Apr. 25, 2008, Toulouse, France, Figs 1-6, pp. 2-3, section "Post-correlation methods proposed".
International Search Report and Written Opinion—PCT/US09/059859, international Search Authority—European Patent Office—Mar. 12, 2010.
Yang, et al., "Acquisition of the GPS L5 signal using coherent combining of I5 and Q5," Proceedings of ION GNSS 2004, Sep. 24, 2004, pp. 2184-2195, Long Beach CA, US, figs 6-11, pp. 2189-2191 section "Coherent combining of I5 and Q5".
Yao-Cheng, et al., "An innovative acquisition method for the GPS and Galileo combined signal," Proceedings of ION GNSS 2007, Sep. 28, 2007, pp. 203-210, Ft. Worth, TX, US, p. 20, section IV;"The proposed acquisition architecture".

* cited by examiner

*Primary Examiner* — Thomas H Tarcza
*Assistant Examiner* — Harry Liu
(74) *Attorney, Agent, or Firm* — Linda G. Gunderson (57) ABSTRACT

The subject matter disclosed herein relates to a system and method for processing multiple navigation signal components received from multiple global navigation satellite systems (GNSS'). In a particular implementation, a code phase in a first navigation signal component may be detected based, at least in part, on information in a second navigation signal component.

30 Claims, 9 Drawing Sheets

ENERGY GRID 1 → 800

FIG. 8B

ENERGY GRID 2 — 805

FIG. 8C

ENERGY GRID 1, ENERGY GRID 1, ENERGY GRID 1, ENERGY GRID 1, ENERGY GRID 1, ENERGY GRID 1, ENERGY GRID 1, ENERGY GRID 1, ENERGY GRID 1, ENERGY GRID 1, ENERGY GRID 1, ENERGY GRID 1

COMPOSITE ENERGY GRID — 815

FIG. 9

METHOD FOR PROCESSING COMBINED NAVIGATION SIGNALS

BACKGROUND

1. Field

The subject matter disclosed herein relates to processing a navigation signal having multiple signal components received from a transmitter.

2. Information

A satellite positioning system (SPS) typically comprises a system of transmitters positioned to enable entities to determine their location on the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellites. For example, a satellite in a constellation of a Global Navigation Satellite System (GNSS) such as Global Positioning System (GPS), Galileo, Glonass or Compass may transmit a signal marked with a PN code that is distinguishable from PN codes transmitted by other satellites in the constellation.

To estimate a location at a receiver, a navigation system may determine pseudorange measurements to satellites "in view" of the receiver using well known techniques based, at least in part, on detections of PN codes in signals received from the satellites. Such a pseudorange to a satellite may be determined based, at least in part, on a code phase detected in a received signal marked with a PN code associated with the satellite during a process of acquiring the received signal at a receiver. To acquire the received signal, a navigation system typically correlates the received signal with a locally generated PN code associated with a satellite. For example, such a navigation system typically correlates such a received signal with multiple code and/or time shifted versions of such a locally generated PN code. Detection of a particular time and/or code shifted version yielding a correlation result with the highest signal power may indicate a code phase associated with the acquired signal for use in measuring pseudorange as discussed above.

Upon detection of a code phase of a signal received from a GNSS satellite, a receiver may form multiple pseudorange hypotheses. Using additional information, a receiver may eliminate such pseudorange hypotheses to, in effect, reduce an ambiguity associated with a true pseudorange measurement. With sufficient accuracy in knowledge of timing of a signal received from a GNSS satellite, some or all false pseudorange hypotheses may be eliminated.

Figure 1:
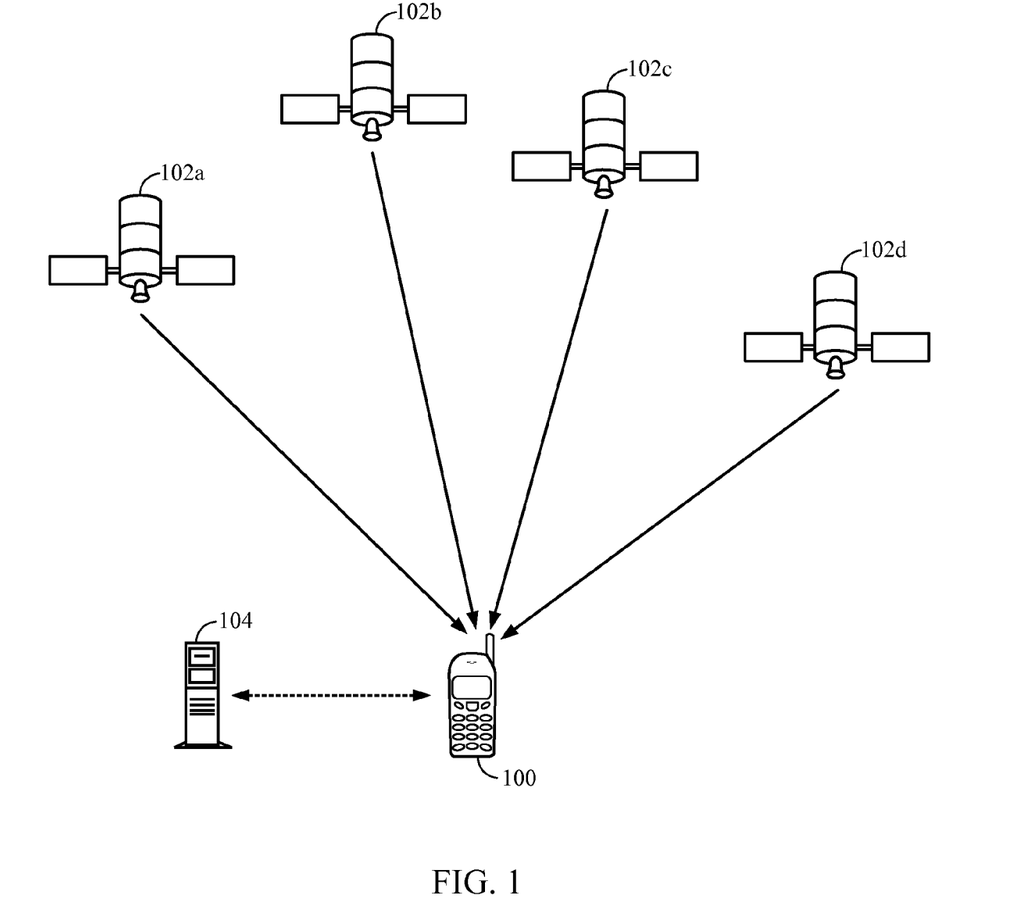
FIG. 1 is a schematic diagram of a satellite positioning system (SPS) according to one aspect.

FIG. 1 illustrates an application of an SPS system, whereby a mobile station (MS) 100 in a wireless communications system receives transmissions from satellites 102a, 102b, 102c, 102d in the line of sight to MS 100, and derives time measurements from four or more of the transmissions. MS 100 may provide such measurements to position determination entity (PDE) 104, which determines the position of the station from the measurements. Alternatively, the subscriber station 100 may determine its own position from this information.

MS 100 may search for a transmission from a particular satellite by correlating the PN code for the satellite with a received signal. The received signal typically comprises a composite of transmissions from one or more satellites within a line of sight to a receiver at MS 100 in the presence of noise. A correlation may be performed over a range of code phase hypotheses known as the code phase search window $W_{CP}$, and over a range of Doppler frequency hypotheses known as the Doppler search window $W_{DOPP}$. As pointed out above, such code phase hypotheses are typically represented as a range of PN code shifts. Also, Doppler frequency hypotheses are typically represented as Doppler frequency bins.

BRIEF DESCRIPTION OF THE FIGURES

Non-limiting and non-exhaustive features will be described with reference to the following figures, wherein like reference numerals refer to like parts throughout the various figures.

SUMMARY

In one particular implementation, a method is provided in which a navigation signal is received from a transmitter. The navigation signal comprises a first navigation signal component and a second navigation signal component. A code phase in the first navigation signal component is determined based, at least in part, on information in the second navigation signal component. It should be understood, however, that this is merely one example implementation and that claimed subject matter is not limited to this particular implementation.

DETAILED DESCRIPTION

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

Methodologies described herein may be implemented by various means depending upon applications according to particular features and/or examples. For example, such methodologies may be implemented in hardware, firmware, software, and/or combinations thereof In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

A "space vehicle" (SV) as referred to herein relates to an object that is capable of transmitting signals to receivers on the Earth's surface. In one particular example, such an SV may comprise a geostationary satellite. Alternatively, an SV may comprise a satellite traveling in an orbit and moving relative to a stationary position on the Earth. However, these are merely examples of SVs and claimed subject matter is not limited in these respects.

Location determination and/or estimation techniques described herein may be used for various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Such location determination techniques described herein may also be used for any combination of WWAN, WLAN and/or WPAN.

According to an example, a device and/or system may estimate its location based, at least in part, on signals received from SVs. In particular, such a device and/or system may obtain "pseudorange" measurements comprising approximations of distances between associated SVs and a navigation satellite receiver. In a particular example, such a pseudorange may be determined at a receiver that is capable of processing signals from one or more SVs as part of a Satellite Positioning System (SPS). To determine its location, a satellite navigation receiver may obtain pseudorange measurements to three or more satellites as well as their positions at time of transmitting.

Techniques described herein may be used with any one of several SPS' and/or combinations of SPS'. Furthermore, such techniques may be used with positioning determination systems that utilize pseudolites or a combination of satellites and pseudolites. Pseudolites may comprise ground-based transmitters that broadcast a PN code or other ranging code (e.g., similar to a GPS or CDMA cellular signal) modulated on an L-band (or other frequency) carrier signal, which may be synchronized with time. Such a transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

A "Global Navigation Satellite System" (GNSS) as referred to herein relates to an SPS comprising SVs transmitting synchronized navigation signals according to a common signaling format. Such a GNSS may comprise, for example, a constellation of SVs in synchronized orbits to transmit navigation signals to locations on a vast portion of the Earth's surface simultaneously from multiple SVs in the constellation. A GNSS satellite may transmit a navigation signal having multiple navigation signal components. The navigation signal components may be transmitted on the same or on different carrier frequencies. Moreover, the navigation signal components may also be transmitted on the same carrier frequency but on different baseband modulations, such as Binary Offset Carrier (1, 1) ("BOC (1, 1)") or Binary Phase Shift Keying ("BPSK"). The navigation signal components may be modulated according to different code lengths. For example, one of the navigation signal components may be a legacy L1 C/A GPS signal, whereas a second navigation signal component may be a proposed L1 C-D GPS signal having a longer code length, just to compare and name a few examples.

Each of the navigation signal components is transmitted and may be received by, for example, a receiver in a mobile station. Upon receipt, the navigation signal components are correlated against a known reference code corresponding to each of the respective navigation signal components. For each navigation signal component, the receiver generates a reference code and compares it against a code in the received navigation signal component.

Figure 2A:
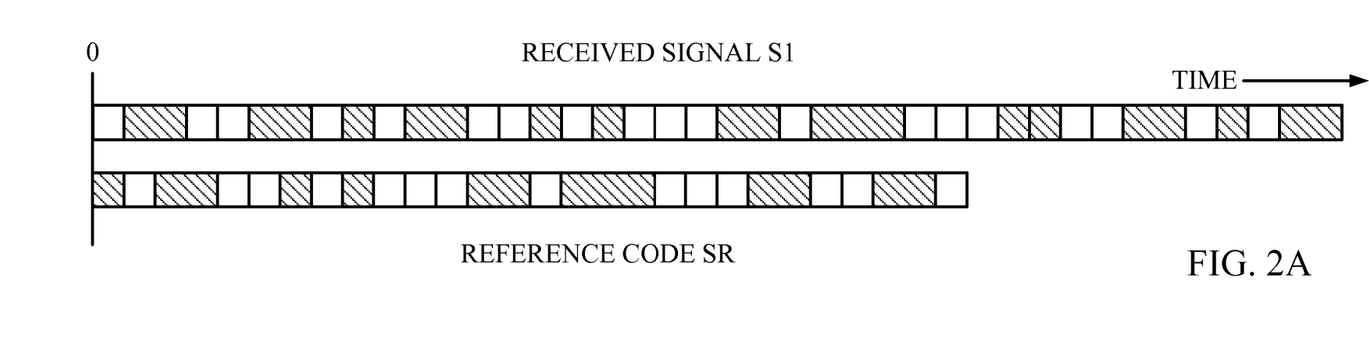
FIGS. 2A and 2B show comparisons of received codes with a reference code according to one implementation.

FIG. 2A shows an example of a comparison between a predetermined code S1 of a navigation signal component as received (beginning at time index 0) and a reference copy SR of the code (hereinafter referred to as the "reference code"). In this example, filled squares indicate one binary symbol (e.g., +1) and open squares indicate the other binary symbol (e.g., −1). It may be seen that in the example of FIG. 2A, the two codes are not aligned.

Figure 2B:
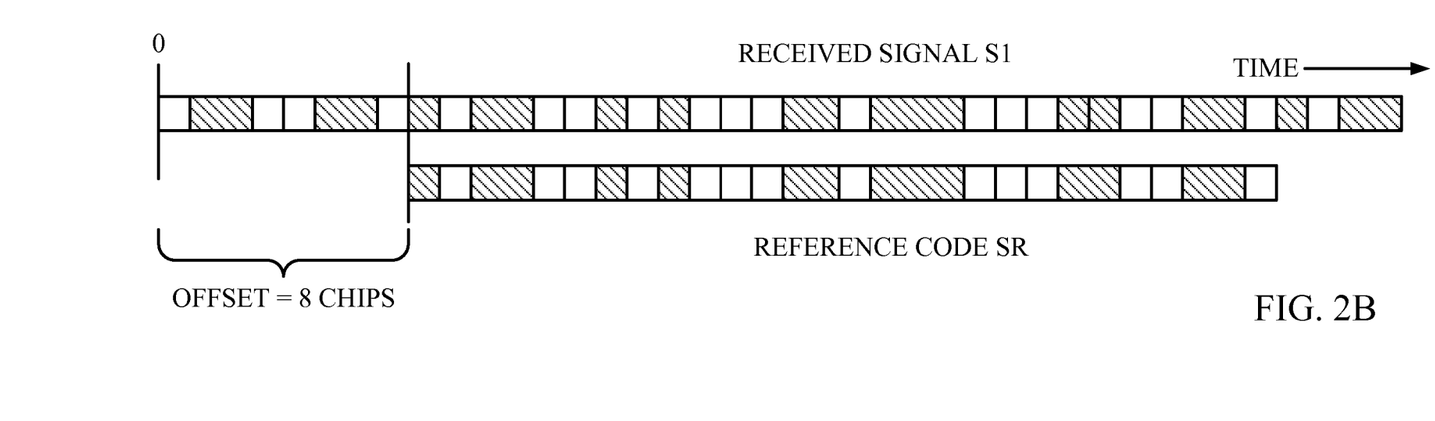

In FIG. 2B, reference code SR is shifted to an offset of eight chips with respect to time index 0. With a reference code in this position, the two codes are now aligned. An offset between the code as received and the reference code, if the reference code is in a position such that the two codes are aligned, is called the code phase of the signal. Thus, received code S1 has a code phase of eight chips.

The code phase may be used as an indication of the delay of the received signal, which in turn may be used as a measure of the distance between transmitter and receiver. Additionally or alternatively, a code phase may be used in synchronizing operations relating to the reception and/or transmission of one or more other signals. For example, timing information derived from the code phase may be used to synchronize a receiver to a slotted access channel. Examples of a slotted access channel include an access channel, which may be transmitted by the transmitter of the received code (e.g. on a downlink or reverse link), and a paging channel, which may be monitored by a receiver at that location (e.g. on an uplink or forward link).

In one example, correlation of a received code sequence with a reference code may be performed in the time domain by integrating the product of the received and reference codes over some portion of the length of the reference code according to relation (1) as follows:

$$y(t) = \int_{k=0}^{N-1} x(t+k)r(k) \quad (1)$$

where x is the received code, r is the reference code of length N, and y(t) is the correlation result at offset t. Here, a received code may comprise a complex baseband signal, such that the correlation is performed for each of I and Q components of the received code.

While correlation results obtained (and/or another expression of the degree of correlation of the two codes) may be used as an energy result for the corresponding offset, the energy result may be calculated as the sum of the squares of such correlation results for the I and Q components. The result of such a calculation over a range of offsets may have a triangular shape that may be smoothed by filtering in a receiver front end.

An energy calculation may be performed on sampled received signal components. Depending on a particular design, energy results may be expressed as fixed-point or floating-point values, and they may in arbitrary units, e.g. in a case where the energy results are used only to determine relative differences between the peaks. In a case where an energy result may also be used for one or more other tasks (e.g. compared to other system parameters), the measurement scale may be selected as appropriate for such a task or tasks.

Figure 3:
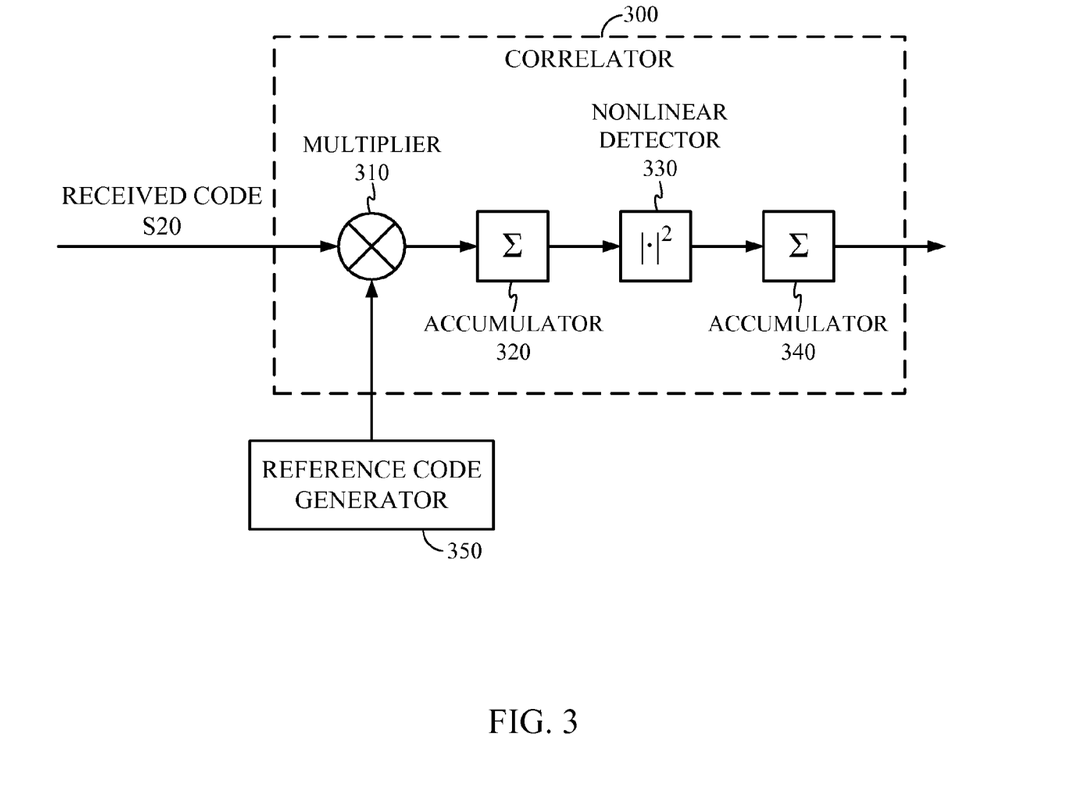
FIG. 3 is a schematic block diagram of a correlator according to a particular example.

FIG. 3 shows a block diagram of one example of a correlator 300 that may be used to obtain energy results in one particular implementation. Multiplier 310 is adapted to multiply complex received code S20 with a reference code, and accumulator 320 is, adapted to accumulate products over a length of the reference code. Nonlinear detector 330, which may be implemented as a squarer, is adapted to obtain a squared sum for each component, and accumulator 340 is adapted to add the squared sums to obtain the energy result. Reference code generator 350, which may be implemented as a shift register such as a linear feedback shift register (LFSR), may be clocked according to the chip rate of the received code or some derivative thereof. Alternatively, a reference code may be read from storage at an appropriate rate or received from an external device or circuit.

Although the example of FIG. 3 shows a serial correlator, correlator 300 may also be implemented to perform parallel correlation (multiplying more than one bit of the codes at the same time) or any combination of serial and parallel operation. A GPS receiver, for example, may include multiple instances of correlator 300, each receiving a copy of a reference code and applying a different corresponding delay, to obtain results for more than one code phase hypothesis at a time. Multiple instances of correlator 300 may also be used to search on more than one reference code at a time. A module including one or more correlators and logic (e.g. a processor) configured to control the correlators to obtain energy results for a desired set of hypotheses may be called a searcher or a means for searching.

Calculation of an energy result as described above may be repeated for each offset (or "code phase hypothesis") to be considered. In the GPS C/A code phase circle, for example, there are 1023 possible hypotheses (or 2046 hypotheses at a resolution of ½ chip). In many cases, however, the number of hypotheses to be searched may be greatly reduced by applying knowledge of the code phase location of the received code as obtained from previous searches and/or from an external source (such as a position determination entity (PDE)). In such an implementation, a search may be reduced to a width of, for example, 256 chips or 32 chips or less.

Alternatively, correlation and/or energy results for the various code phase hypotheses may be obtained via operations in a frequency domain. Here, an entire code phase circle may be efficiently searched at a selected resolution by, for example, transforming the received code into the frequency domain (e.g., using a discrete Fourier transform (DFT) operation such as a fast Fourier transform (FFT)), multiplying the transformed signal with a matched filter of the reference code, and applying an inverse transform to obtain the corresponding results in the time domain. Some frequency-domain correlation techniques may also be used to perform a more narrow search in the frequency domain. For example, U.S. Published Patent Application No. 2004/0141574 (Akopian, published Jul. 22, 2004) purports to describe a frequency-domain method for searching over a limited range of code phases.

As for calculations in a time domain, it may be desired in frequency-domain implementations to include multiple instances of an appropriate correlator (e.g., a set of logic elements, such as transistors and/or gates, programmed or otherwise arranged to perform FFT, IFFT, and associated operations) to support searching for more than one reference code at a time. It may also be desirable to perform transformation of the reference code in advance and store the result in memory (e.g., in nonvolatile memory).

In addition to locating a received code in code phase dimension, it may also be desirable to consider relative motion between a receiver and a transmitter. Here, in an implementation where a navigation signal is received having two navigation signal components, such relative motion between a receiver and a transmission source (and/or apparent motion between the two, as might be caused by a moving reflector) causes a Doppler frequency error at the receiver that can be expressed in Hertz as $$\frac{vf}{c}\cos\varphi,$$

where v is the apparent relative velocity of the receiver and source, f is the carrier frequency of a navigation signal component in Hertz, c is the speed of light, and φ is the angle between the direction of travel of the receiver and the direction from the receiver to the transmission source. If the receiver is traveling directly toward the source, then φ=0, and if the receiver is traveling directly away from the source, then φ=π radians. In this example, the Doppler would effectively reduce the frequency of the signal as received at the receiver (i.e., meaning the observed frequency is smaller than the true frequency).

For a terrestrial GPS user in a particular implementation, a Doppler shift due to the combined movement of the SV and user relative to one another may amount to about +/−2.7 ppm. Frequency error of one or more oscillators at the receiver may add about another 2 ppm, for a total of 4.7 ppm of frequency uncertainty (alternatively, local oscillator error may be corrected at least somewhat, e.g. with a PLL or other correction loop). This 4.7 ppm corresponds to about +/−7.5 kHz at the L1 carrier frequency of 1.57542 GHz.

Figure 4:
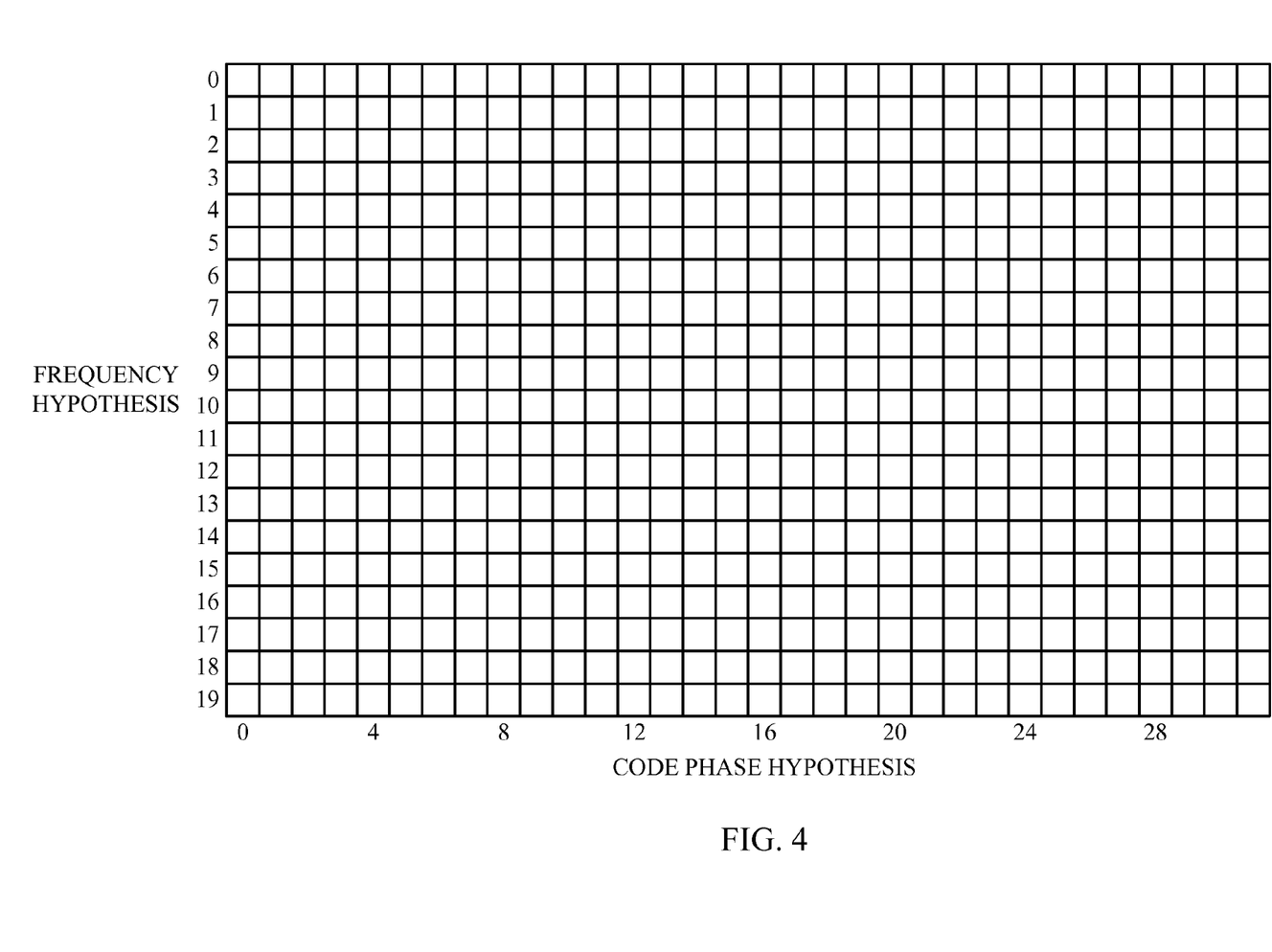
FIG. 4 is a diagram showing a two-dimensional search window according to one particular implementation.

FIG. 4 shows an example of a code phase search window extending across twenty hypotheses in the frequency dimension and 32 code phase hypotheses or bins in a code phase dimension. Selection of the particular location and/or spacing of the hypotheses of each dimension of the code phase search window may be guided by information obtained externally and/or from one or more previous searches. For example, it may be known or estimated that the desired signal lies within a certain number of chips from a given code phase, and/or that the signal may be found within a certain bandwidth around a given frequency, such that the code phase search window may be defined accordingly. In a case where searches are to be conducted for more than one code, associated search windows need not have the same dimensions.

A search may be conducted (for example, according to a search window of D frequency hypotheses by C code hypotheses) to obtain a grid of D×C energy results, each result corresponding to one of the D frequency hypotheses and one of the C code hypotheses. The set of energy results that correspond to the code phase hypotheses for a particular frequency hypothesis are referred to herein as a "Doppler bin."

Figure 5:
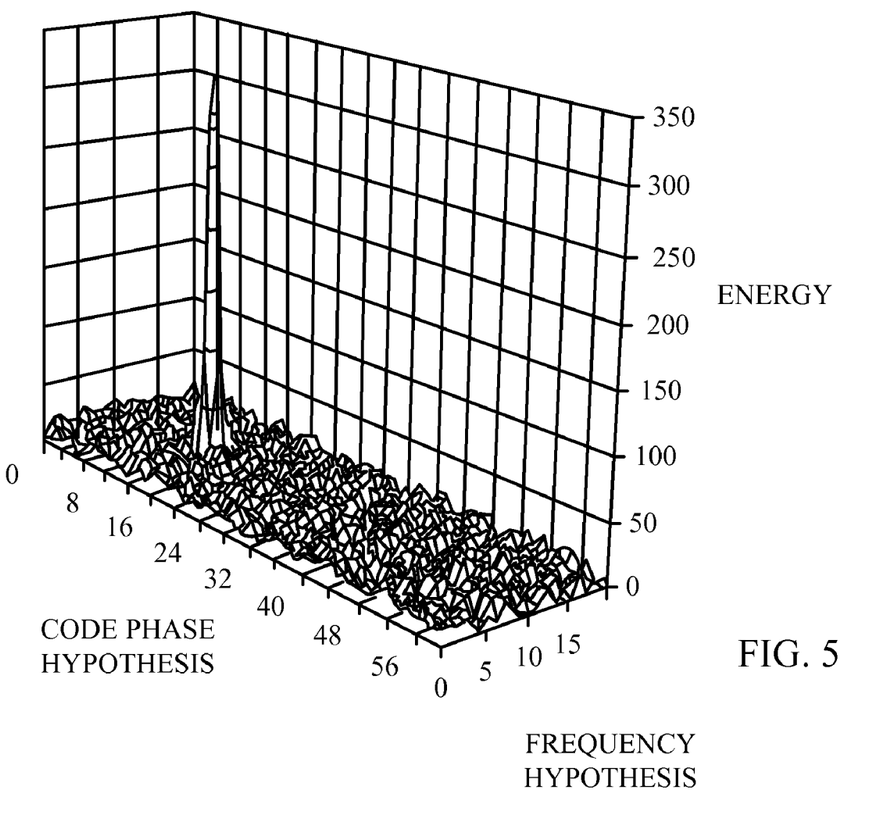
FIG. 5 is an energy plot showing a peak as may be obtained from a line-of-sight signal in one particular example.

FIG. 5 shows an example of a peak within an energy profile or grid of twenty Doppler bins, each bin having 64 code phase hypotheses. In this example, adjacent code phase hypotheses are ½-chip apart, such that the grid extends across 32 chips in code space. An energy peak in this figure indicates a presence of the selected SV signal at code phase hypothesis 16 in Doppler bin 10. A receiver (or a searcher within such a device) may produce energy grids for several different corresponding SVs from the same portion of a received signal, with the grids possibly having different dimensions.

A received signal may include versions of the same transmitted signal that propagate over different paths to arrive at the receiver at different times. Correlation of such a received signal with the corresponding reference code may result in several peaks at different grid points, each peak due to a different instance (also called a multipath) of the transmitted signal. These multipath peaks may fall within the same Doppler bin.

Figure 6:
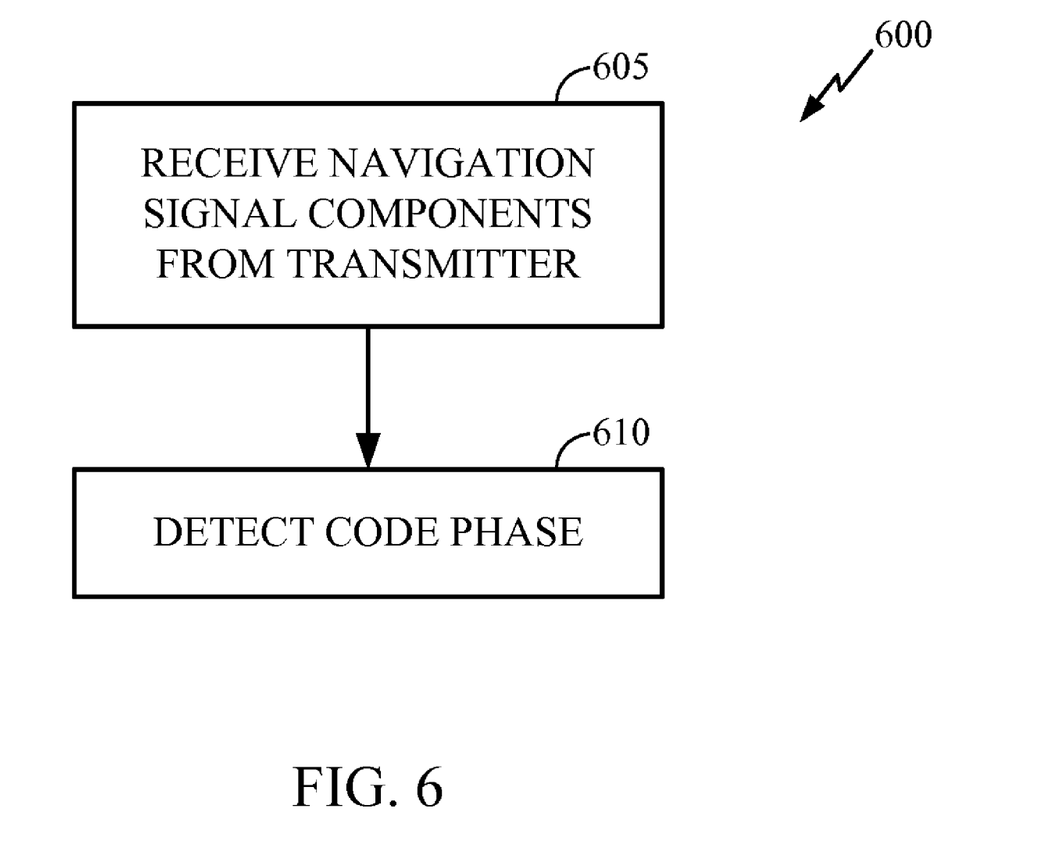
FIG. 6 illustrates a method of detecting a code phase in a received navigation signal according to one aspect.

FIG. 6 illustrates a method 600 of detecting a code phase in received navigation signal components according to one implementation. First, at operation 605, navigation signal components are received from a transmitter. In one example, a first and a second navigation signal component are received. The navigation signal components may be received as a single navigation signal from the transmitter. Next, a code phase is detected at operation 610 based, at least in part, on information in the second navigation signal component. Examples of types of information utilized from the second navigation signal component may include, for example, correlation detections, timing information, and Doppler shift estimates.

A transmitter transmitting the navigation signal having the navigation signal components may be located on, for example, an SV or a terrestrial location. In one particular implementation, the navigation signal may be received at a receiver on a mobile station (MS) such as MS 100 shown in FIG. 1.

According to one implementation, as discussed above, a navigation signal may comprise multiple navigation signal components. For example, a navigation signal may include a first navigation signal component that has been modulated according to a Binary Phase Shift Keying ("BPSK") modulation scheme and a second navigation signal component modulated according to a different modulation scheme, such as Binary Offset Carrier (1, 1) ("BOC (1, 1)"). However, these are merely examples of different modulation schemes that may be used to provide associated different navigation signal components of a navigation signal and the claimed subject matter is not limited in this respect. Also, although a navigation signal has been described above as including first and second navigation signal components, it should be appreciated that additional navigation signal components may also be included in such a navigation signal, such as third and fourth navigation signal components according to some implementations.

According to one implementation, a navigation signal having the first and second navigation signal components may be transmitted from a single transmitter, such as a single transmitter located at an SV. According to one implementation, the first and second navigation signal components of a navigation signal may contain different navigation information for use by a receiver. Accordingly, such a receiver may detect the code phase and the Doppler shift for both the first and second navigation signal components.

According to one aspect, processing of first and second navigation signal components is coherently combined. According to another aspect, processing of first and second navigation signal components is non-coherently combined. By combining the processing of received first and second navigation signal components, a higher gain of the received navigation signal may be achieved than would be possible if each received navigation signal component were independently processed.

In the event that, for example, first and second navigation signal components are transmitted on the same carrier frequency in a navigation signal, processing of such navigation signal components may be combined coherently. First and second navigation signal components transmitted as a navigation signal on the same carrier frequency experience a common Doppler shift and propagation channel. In additive white Gaussian noise (AWGN) and flat fading channels, attenuation on first and second navigation signal components may also be the same. Because first and second navigation signal components of a navigation signal arrive at the receiver with the same carrier phase in this case, processing of the first and second navigation signal components is combined coherently.

Coherent combining may be implemented in the receiver by adding coherent pre-detection sums output by a correlator or by treating the two navigation signal components as a single composite signal.

Figure 7A:
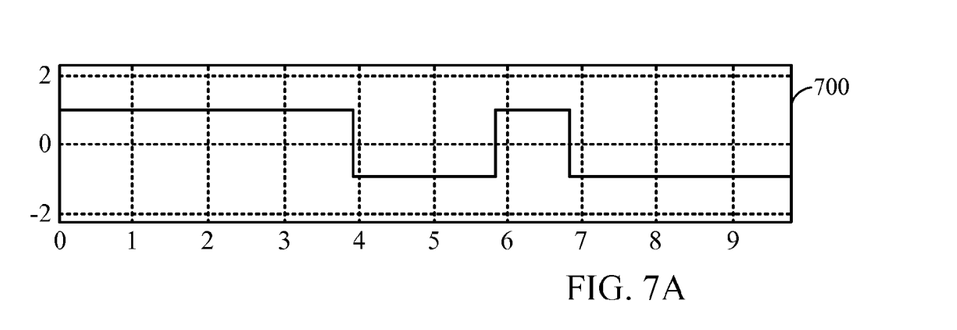
FIGS. 7A-C illustrate first and second navigation signal components, and of a composite signal according to one aspect.

FIG. 7A illustrates a reference code 700 a first navigation signal component modulated according to a BPSK modulation scheme according to one aspect. As shown, the reference code for the first modulation signal component comprises a binary signal that has a value of either "1" or "−1" at any time interval. In this example, each one microsecond (μsec) interval is representative of a single chip in a PN sequence of a transmitted signal, and the signal is either "1" or "−1" for the entire μsec interval.

Figure 7B:
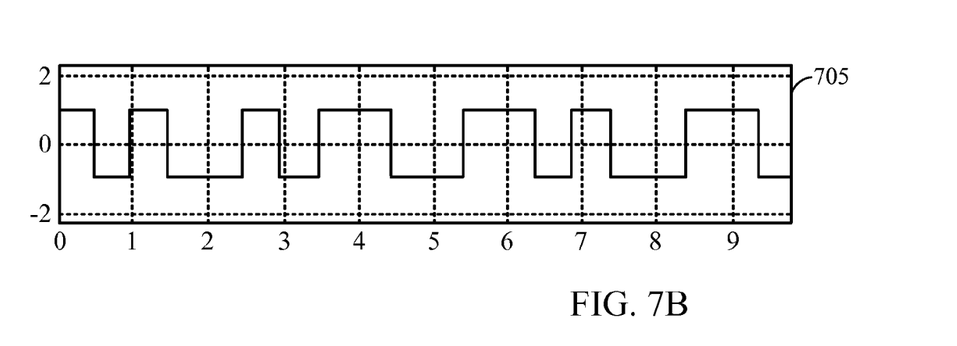

FIG. 7B illustrates a reference code 705 a second navigation signal component modulated according to a BOC (1, 1) modulation scheme according to one aspect. As shown, the reference code for the second modulation signal component comprises a binary signal that has a value that transitions from either "1" or "−1" or from "−1" to "1" at any time interval. In this example, each one microsecond (μsec) interval may represent a single chip in a PN sequence of a transmitted signal. As shown, the PN sequence either begins at "1" at the start of the interval and ends at "−1" at the end of the interval, or begins at "−1" at the start of the interval and ends at "1" at the end of each μsec interval.

Accordingly, reference codes for signal components shown in FIGS. 7A and 7B are modulated according to different modulation schemes. In one particular implementation, processing of the first and second navigation signal components may include determining a composite reference code. Such a composite reference code may be used to correlate the received navigation signal having the first and second navigation signal components. The composite reference code may be determined by summing known reference codes for the first and second navigation signal components. In this example, the composite reference code may be determined by summing the reference code for the first and second navigation signal components shown in FIGS. 7A and 7B.

Figure 7C:
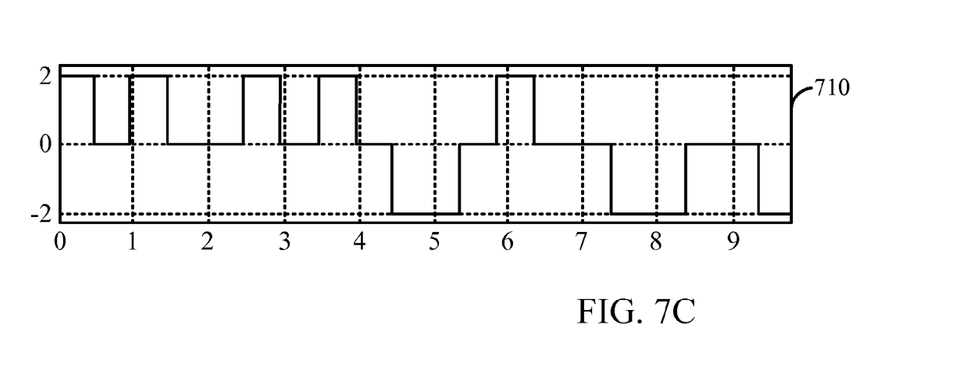

FIG. 7C illustrates a composite reference code 710 according to one aspect. The composite reference code is a tri-level code or signal, as opposed to the reference code for the first and second navigation signal components, both of which are binary codes or signals.

In generating the composite reference code, the reference codes for the first and second navigation signal components are effectively summed at a given point in time. Summing the binary reference codes for the respective navigation signal components results in a tri-level composite reference code, which can have three different values, i.e., of "2," "0," and "2" at a given point in time. The composite reference code transitions between "2" and "0," "0" and "2," "0" and "−2," and "−2" and "0" during any of the one μsec intervals.

The composite reference code is used to correlate the received combined first and second navigation signal components. By coherently combining the processing including correlating of the navigation signal components in this manner, an overall signal gain is achieved that is greater than either of the first and the second navigation signals correlated individually. In one implementation, for example, a first navigation signal component may comprise a legacy GPS L1 C/A code modulated according to BPSK having a minimum receive power of −158.5 dBW in the open sky, while a second navigation signal component may comprise a code modulated according to BOC (1, 1) on the L1 frequency having a minimum receive power of −157 dBW. The combination of the first and second navigation signal components may therefore have a receive power of −154.67dBW. Accordingly, a gain of 3.82 dBW and 2.32 dBW, respectively, may be achieved versus independent processing of L1 C/A and the L1C signals, respectively.

In a particular embodiment where correlation is a linear operation, a receiver need only correlate a received signal against the composite reference code to receive the combined energy from both navigation signal components. Since the sum of two bi-level (1, −1), i.e., binary, codes or signals is a tri-level (2,0, −2) code or signal, a correlator may be implemented by skipping samples if the composite reference waveform is 0.

Implementations of methods of coherently combining the first and second navigation signal components discussed above may be applicable in particular instances where first and second navigation signals are in the same phase and are transmitted on the same carrier frequency. However, in other implementations, the first and second navigation signal components may not be transmitted on the same carrier frequency and processing of the first and second navigation signal components may instead be non-coherent.

Processing of navigation signal components transmitted by a single transmitter on different frequencies can be combined non-coherently to average system noise and correlate the combined navigation signal components for a given period and enhance detection performance. This can be implemented by summing energy profiles or grids obtained by independent looks or dwells on each component signal. An energy profile may be represented by an energy grid or chart showing correlation peaks for a received navigation signal. The energy profile may include correlation detections located at a code phase hypothesis versus frequency/Doppler hypothesis, such as the ones shown above in FIGS. 4 and 5, for example. Upon receipt of a navigation signal component, the navigation signal component is correlated against a known reference code/signal by the receiver. As a result of the correlation, correlation detections are determined for a code phase hypothesis and Doppler bins.

Figure 8A:
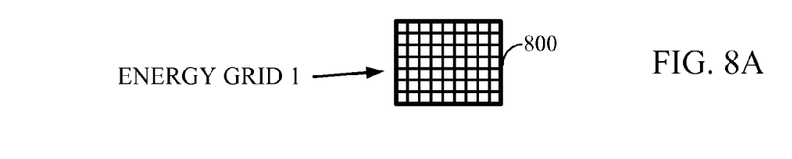
FIG. 8A-D illustrate energy profiles of first and second navigation signal components, and of a composite signal according to one aspect.
Figure 8B:
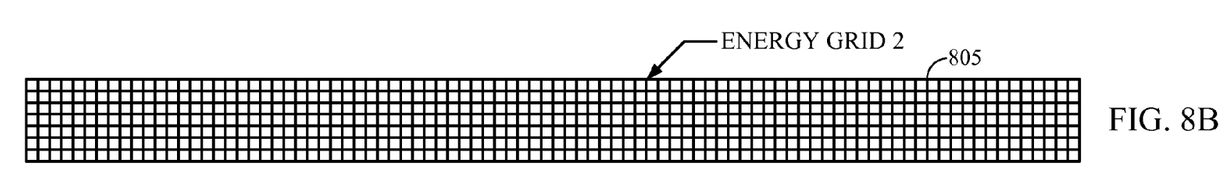

FIGS. 8A-D illustrate energy profiles for different navigation signal components transmitted by a single SV and a composite signal according to one aspect. FIG. 8A illustrates an energy profile 800 for a first navigation signal, and FIG. 8B illustrates an energy profile 805 for a second navigation signal component transmitted on a different frequency from that of a first navigation signal component. In the particular illustration of FIGS. 8A-D, an energy profile for a particular navigation signal component may include a code phase hypothesis/offset in a horizontal direction and frequency hypothesis/Doppler shift in a vertical direction. The length of the code phase hypothesis domain may be proportional to a length of a pseudo-random noise code used to modulate the associated navigation signal component. For example, an energy profile for a legacy GPS L1 C/A code may have a known width in the code phase hypothesis (i.e., in the horizontal direction), such as a pseudo-random noise code of 1023 chips at 1.0 msec each. Other GPS codes, such as GPS L1C-D, may have a longer pseudo-random noise code used to modulate the transmitted navigation signal component, such as a pseudo-random noise code of 10230 chips at 10.0 msec each. Accordingly, a code phase hypothesis domain for the longer GPS codes would be ten times as long as the code phase hypothesis domain for the legacy GPS L1 C/A code.

FIG. 8A illustrates an energy profile having correlation peaks for a first navigation signal component. FIG. 8B illustrates an energy profile having correlation peaks for a second navigation signal component. In this particular implementation, the first navigation signal component is modulated with a code length that is 1/10 that of a code modulating the second navigation signal component.

Figure 8C:
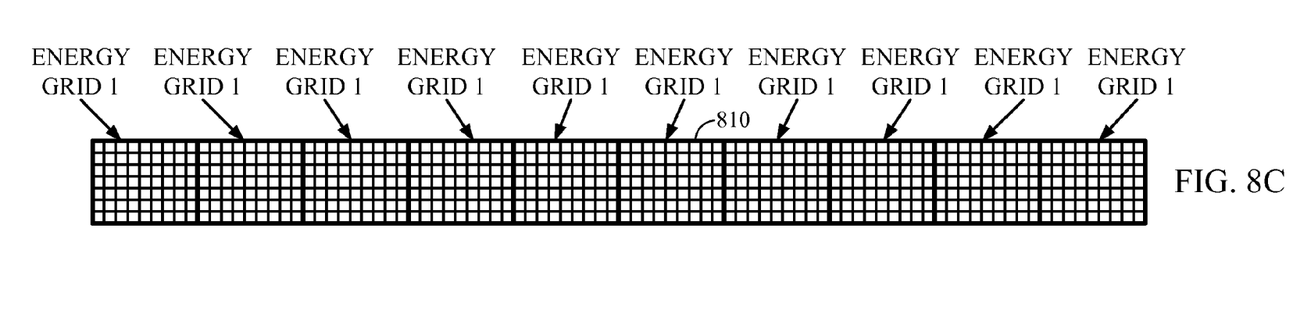

In order to sum the energy profiles for the first and second navigation signal components, respective energy profiles may be normalized in code phase hypothesis (i.e., in the horizontal direction) and in the frequency hypothesis (i.e., in the vertical direction). Because the first navigation signal component in this particular implementation is modulated with a pseudo-random noise code of 1023 chips and therefore has a code phase domain 1/10 that of the second navigation signal component, which is modulated with a pseudo-random noise code of 10230 chips in this particular example, a first energy profile 810 may be repeated ten times for each non-repeating interval of the second energy profile 805.

Figure 8D:
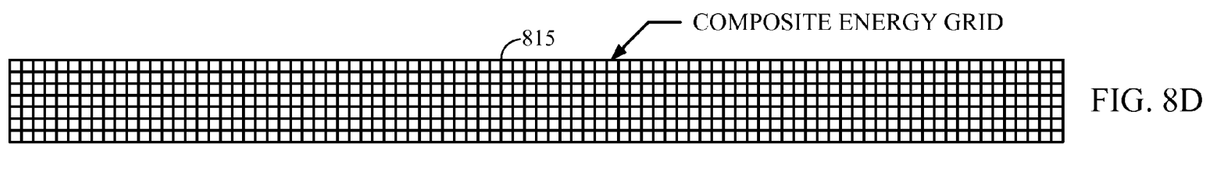

First and second energy profiles 805 and 810 may be summed to generate a composite energy profile 815 shown in FIG. 8D. Signals on different carrier frequencies will experience different Doppler shifts based, at least in part, on transmission carrier frequencies. Such Doppler shift (e.g., as applied to energy profiles 805 and 810 derived from different navigation signal components) can be normalized and expressed in Hertz as $$\frac{v|f_1 - f_2|}{c}\cos\varphi,$$

where v is an apparent velocity of the receiver relative to the transmission source, $f_1$ is the carrier frequency of a first navigation signal component in Hertz, $f_2$ is the carrier frequency of a second navigation signal component in Hertz, c is the speed of light, and $\phi$ is the angle between the direction of travel of the receiver and the direction from the receiver to the transmission source. The values of $\phi$ and v may be determined via acquisition assistance data from a position determination entity (PDE) such as the PDE 104 shown in FIG. 1, for example. Energy cells are added such that the Doppler bins of the summed cell correspond to the same SV-User velocity vector.

FIGS. 8A-D illustrate an example of non-coherent combining where the first navigation signal component's energy profile 800 is repeated and the energy cells in the frequency dimension have a one-to-one mapping when scaled to remove the effects of the carrier frequencies. The various energy cells in the energy profiles are aligned according to code phase hypothesis and frequency.

By non-coherently combining processing of the first and second navigation signal components, a gain of correlation detections is increased.

Figure 9:
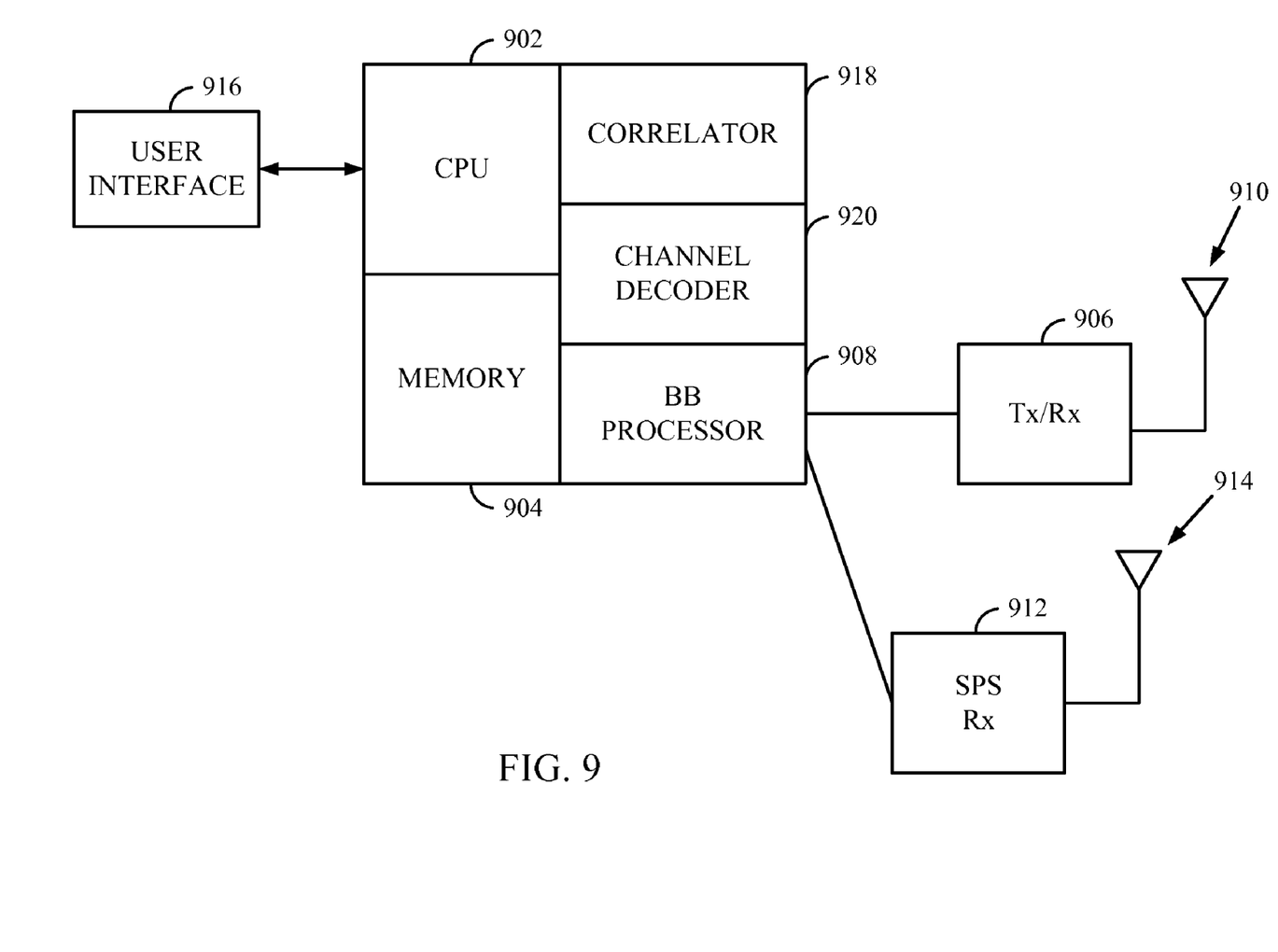
FIG. 9 is a schematic diagram of a mobile station according to one aspect.

FIG. 9 shows a particular implementation of an MS in which radio transceiver 906 may be adapted to modulate an RF carrier signal with baseband information, such as voice or data, onto an RF carrier, and demodulate a modulated RF carrier to obtain such baseband information. An antenna 910 may be adapted to transmit a modulated RF carrier over a wireless communications link and receive a modulated RF carrier over a wireless communications link.

Baseband processor 908 may be adapted to provide baseband information from CPU 902 to transceiver 906 for transmission over a wireless communications link. Here, CPU 902 may obtain such baseband information from an input device within user interface 916. Baseband processor 908 may also be adapted to provide baseband information from transceiver 906 to CPU 902 for transmission through an output device within user interface 916.

User interface 916 may comprise a plurality of devices for inputting or outputting user information such as voice or data. Such devices may include, for example, a keyboard, a display screen, a microphone, and a speaker.

SPS receiver (SPS Rx) 912 may be adapted to receive and demodulate transmissions from SUVs through SPS antenna 914, and provide demodulated information to correlator 918. Correlator 918 may be adapted to derive correlation functions from the information provided by receiver 912. For a given PN code, for example, correlator 918 may produce a correlation function defined over a range of code phases to set out a code phase search window, and over a range of Doppler frequency hypotheses as illustrated above. As such, an individual correlation may be performed in accordance with defined coherent and non-coherent integration parameters.

Correlator 918 may also be adapted to derived pilot-related correlation functions from information relating to pilot signals provided by transceiver 906. This information may be used by a subscriber station to acquire wireless communications services.

Channel decoder 920 may be adapted to decode channel symbols received from baseband processor 908 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 920 may comprise a turbo decoder.

Memory 904 may be adapted to store machine-readable instructions, which are executable to perform one or more of processes, examples, implementations, or examples thereof which have been described or suggested. CPU 902 may be adapted to access and execute such machine-readable instructions. Through execution of these machine-readable instructions, CPU 902 may direct correlator 918 to analyze the SPS correlation functions provided by correlator 918, derive measurements from the peaks thereof, and determine whether an estimate of a location is sufficiently accurate. However, these are merely examples of tasks that may be performed by a CPU in a particular aspect and claimed subject matter in not limited in these respects.

In a particular example, CPU 902 at a subscriber station may estimate a location the subscriber station based, at least in part, on signals received from SVs as illustrated above. CPU 902 may also be adapted to determine a code search range for acquiring a second received signal based, at least in part, on a code phase detected in a first received signals as illustrated above according to particular examples.

The coherent and non-coherent methods described above are applicable to various navigation systems, such as legacy GPS L1 C/A, Galileo L1F, as well as proposed GPS L1C-D and GPS L1C-P.

These methods are also applicable to proposed Quasi-Zenith Satellite System (QZSS) satellites. Such QZSS satellites may transmit a Space Based Augmentation System (SBAS) signal (L1—Switching Activity Interchange Format (SAIF)) in addition to GPS-like L1 signals. Such signals may be processed together at a receiver as described above to achieve an improved SNR.

The combining of processing navigation signal components, either coherently or non-coherently, results in improved overall navigation system performance. The SNR is improved and sensitivity for low power navigation signal components is improved.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A computer-implemented method, comprising:
   under the control of one or more computer systems configured with executable instructions,
   receiving a navigation signal from a transmitter, the navigation signal comprising a first navigation signal component and a second navigation signal component; and
   detecting a code phase in the first navigation signal component based, at least in part, on information in the second navigation signal component, the detecting comprising:
   calculating first and second energy profiles by integrating products of the first and second navigation signal components and first and second reference codes respectively over lengths of the first and second reference codes respectively and determining the code phase from the calculated first and second energy profiles.

2. The method of claim 1, wherein the first navigation signal component is modulated with a Binary Phase Shift Keying technique.

3. The method of claim 1, wherein the second navigation signal component is modulated with a Binary Offset Carrier (1, 1) technique.

4. The method of claim 1, further comprising combining processing of the first and second navigation signal components.

5. The method of claim 4, wherein the first and second navigation signal components are received on a same carrier frequency and the combining comprises coherently combining processing of the first and second navigation signal components.

6. The method of claim 5, wherein the detecting the code phase comprises correlating the first and second navigation signal components with a tri-level reference signal.

7. The method of claim 5, wherein the coherently combining processing comprises summing a reference signal for the first navigation signal component and a reference signal for the second navigation signal component to generate a composite reference signal.

8. The method of claim 4, wherein the combining comprises non-coherently combining processing of the first navigation signal component and the second navigation signal component.

9. The method of claim 8, wherein the non-coherently combining comprises determining the first energy profile based, at least in part, on the received first navigation signal component, determining the second energy profile based, at least in part, on the received second navigation signal component, and wherein the combining processing of the first and second navigation signal components comprises summing the first and second energy profiles.

10. The method of claim 9, wherein each of the first and second energy profiles comprises an array of energy cells aligned according to time and frequency.

11. The computer-implemented method of claim 1, wherein calculating the first and second energy profiles comprises:
multiplying the first navigation signal component with the first reference code and accumulating a product of the multiplication over the length of the first reference code; and
multiplying the second navigation signal component with the second reference code and accumulating a product of the multiplication over the length of the second reference code.

12. An apparatus, comprising:
a receiver adapted to receive a navigation signal component from a transmitter, the navigation signal comprising a first navigation signal, component and a second navigation signal component; and
a processor adapted to detect a code phase in the first navigation signal component based, at least in part, on information in the second navigation signal component by:
calculating first and second energy profiles by integrating products of the first and second navigation signal components and first and second reference codes respectively over lengths of the first and second reference codes respectively; and
determining the code phase from the first and second energy profiles.

13. The apparatus of claim 12, wherein the processor is further adapted to combine processing of the first and second navigation signal components.

14. The apparatus of claim 12, wherein the first and second navigation signal components are transmitted on a same carrier frequency and wherein the processor is further adapted to coherently combine processing of the first second navigation signal components.

15. The apparatus of claim 12, wherein the processor is further adapted to non-coherently combine processing of the first and second navigation signal components.

16. The apparatus of claim 15, wherein the processor is further adapted to non-coherently combine processing of the first and second navigation signal components based, at least in part, on
determining the first energy profile based, at least in part, on the received first navigation signal component;
determining the second energy profile based, at least in part, on the received second navigation signal component; and
summing the first and second energy profiles.

17. The apparatus of claim 12, wherein calculating the first and second energy profiles comprises:
multiplying the first navigation signal component with the first reference code and accumulating a product of the multiplication over the length of the first reference code; and
multiplying the second navigation signal component with the second reference code and accumulating a product of the multiplication over the length of the second reference code.

18. An apparatus, comprising:
means for receiving a navigation signal component from a transmitter, the navigation signal comprising a first navigation signal component and a second navigation signal component; and
means for detecting a code phase in the first navigation signal component based, at least in part, on information in the second navigation signal component, the means for detecting including:
means for calculating a first and second energy profiles, the means for calculating including means for integrating products of the first and second navigation signal components and a first and second reference codes respectively over a length of the first and second reference codes respectively; and
means for determining the code phase from the first and second energy profiles.

19. The apparatus of claim 18, further comprising means for combining processing of the first and second navigation signal components.

20. The apparatus of claim 19, wherein the means for combining further comprises means for coherently combining processing of the first navigation signal component and the second navigation signal component in response to the first and second navigation signal components being received on a same carrier frequency.

21. The apparatus of claim 19, wherein the means for combining further comprises means for non-coherently combining processing of the first and second navigation signal components.

22. The apparatus of claim 21, wherein the means for non-coherently combining is further adapted to non-coherently combine processing the first and second navigation signal components based, at least in part, on
determining the first energy profile based, at least in part, on the received first navigation signal component;
determining the second energy profile based, at least in part, on the received second navigation signal component; and
summing the first and second energy profiles.

23. An article comprising:
a storage medium comprising machine-readable instructions stored thereon which, if executed by a computing platform, are adapted to enable the computing platform to:
receive a navigation signal from a transmitter, the navigation signal comprising a first navigation signal component and a second navigation signal component; and
detect a code phase in the first navigation signal component based, at least in part, on information in the second navigation signal component by:
calculating a first and second energy profiles by integrating products of the first and second navigation signal components and first and second reference codes respectively over lengths of the first and second reference codes respectively; and
determining the code phase from the first and second energy profiles.

24. The article of claim 23, wherein the machine-readable instructions are further adapted to enable the computing platform to combine processing of the first and second navigation signal components.

25. The article of claim 24, wherein a combining of the processing comprises non-coherently combining processing of the first navigation signal component and the second navigation signal component.

26. The article of claim 25, wherein the non-coherently combining comprises determining the first energy profile based, at least in part, on the received first navigation signal component, determining the second energy profile based, at least in part, on the received second navigation signal component, and wherein a combining of the processing of the first and second navigation signal components comprises summing the first and second energy profiles.

27. The article of claim 24, wherein the machine-readable instructions are further adapted to enable the computing platform to receive the first and second navigation signal components on a same carrier frequency and a combining of the processing comprises coherently combining processing of the first and second navigation signal components.

28. The article of claim 27, wherein the coherently combining processing comprises summing a reference signal for the first navigation signal component and a reference signal for the second navigation signal component to generate a composite reference signal.

29. The article of claim 24, wherein the machine-readable instructions are further adapted to enable the computing platform to correlate the first and second navigation signal components with a tri-level reference signal to detect the code phase.

30. The article of claim 23, wherein calculating the first and second energy profiles comprises:
multiplying the first navigation signal component with the first reference code and accumulating a product of the multiplication over the length of the first reference code; and
multiplying the second navigation signal component with the second reference code and accumulating a product of the multiplication over the length of the second reference code.

\* \* \* \* \*

UNITED STATES PATENT AND TRADEMARK OFFICE
Certificate

Patent No. 7,982,668 B2                                        Patented: July 19, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Rizwan Ahmed, Alexandria, VA (US); Rayman Wai Pon, Cupertino, CA (US); Paul A. Conflitti, Los Gatos, CA (US); and Douglas Neal Rowitch, Del Mar, CA (US).

Signed and Sealed this Twentieth Day of May 2014.

*JACK KEITH*
*Supervisory Patent Examiner*
*Art Unit 3646*
*Technology Center 3600*